July 2, 1968  R. B. AKELL  3,391,064
METHANOL REFINING

Filed Aug. 28, 1967  2 Sheets-Sheet 2

INVENTOR
ROBERT B. AKELL

BY

AGENT

United States Patent Office 3,391,064
Patented July 2, 1968

3,391,064
METHANOL REFINING
Robert Berry Akell, Green Acres, Wilmington, Del., assignor to E. I. du Pont de Nemours and Company, Wilmington, Del., a corporation of Delaware
Continuation-in-part of application Ser. No. 524,700, Feb. 3, 1966. This application Aug. 28, 1967, Ser. No. 663,721
6 Claims. (Cl. 203—83)

ABSTRACT OF THE DISCLOSURE

Crude methanol containing 15–25% water and 1–3% organic impurities is refined by causing the methanol to split between a bottom and a side stream in the first column. Forcing the methanol to the bottom maintains the bottom water concentration below that at which ethanol becomes more volatile than methanol, thus permitting the takeoff of an ethanol free side stream. The side and bottom streams are further distilled to recover the methanol product.

Cross reference to related applications

This application is a continuation-in-part of my copending application Ser. No. 524,700, filed Feb. 3, 1966, now abandoned.

Background of the invention

This invention relates to purification of methanol and more particularly to a process for refining of a crude methanol containing a substantial proportion of water and various organic impurities by distillation. The process is particularly suited for use in refining a crude methanol product such as can be obtained by the process described and claimed in copending U.S. application Ser. No. 524,698, filed Feb. 3, 1966.

The process of the copending application results in a crude methanol containing about 15 to 25 weight percent water and about 1 to 3 weight percent organic impurities. These organic impurities, for purpose of the description herein, are classified as dimethyl ether (DME), ethanol, light ends and heavy ends. The "light ends" are materials boiling below the normal boiling point of methanol, principally methylal, acetone and methyl formate. The "heavy ends" are materials boiling above the normal boiling point of methanol, principally such as isopropanol, normal propanol, isobutanol, and some higher alcohols (Hi-alcohol). Ethanol is the predominant alcohol impurity and is difficult to economically remove to the degree required to meet methanol purity standards.

Brief summary of the invention

According to the invention there is provided a process for refining such a crude methanol product which comprises: feeding the crude to a first column, removing approximately one third or more of the methanol as a side stream essentially free of water, ethanol and heavy ends, removing light ends and dimethyl ether overhead, and removing the remaining methanol, water, ethanol and heavy ends from the bottom, the mole fraction of water in the bottoms being less than about 0.8; feeding the methanol side stream from the first column to a second column, removing residual light ends and dimethyl ether overhead and removing a bottoms product consisting of high purity methanol. The methanol from the bottoms product of the first column is recovered by feeding the product to a third column, removing water and heavy ends from the bottom and removing overhead methanol, ethanol and residual heavy ends; feeding the overhead from the third column to a fourth column, removing the residual heavy ends and ethanol from the bottom and removing methanol overhead; and feeding the methanol overheaded from the fourth column to the second column for removal of any residual light ends.

Detailed description of the invention

Figure 1:
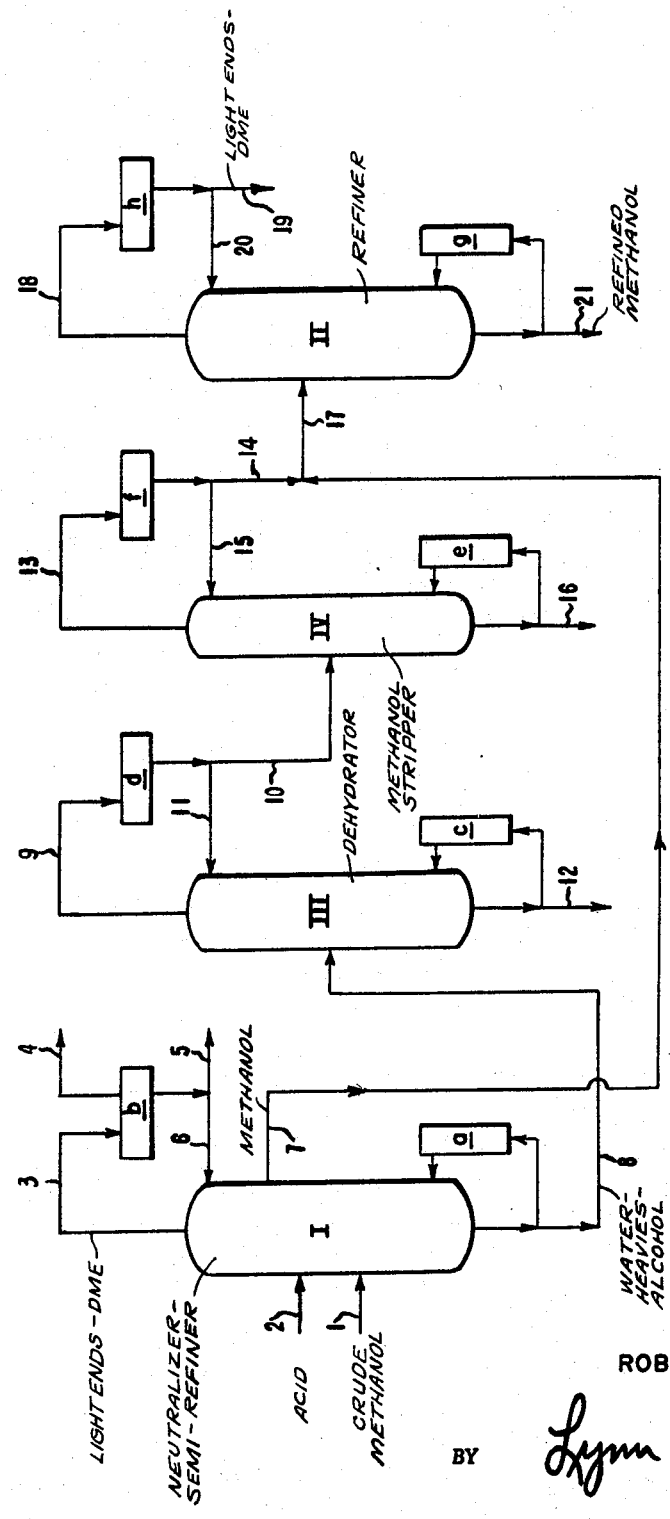
FIG. 1 is a diagrammatic representation of distillation apparatus suitable for carrying out the process of the invention.

Prior art in distillation would permit skilled practitioners to design a workable process for refining a crude methanol of the type described above to meet methanol product specification of any reasonable purity. A typical distillation process would in essence consist of feeding the crude methanol to a distillation column and removing methanol overhead along with light ends and ethanol; water and heavy ends would leave the column at the bottom and be distilled in one or more columns to dehydrate and concentrate heavy ends, largely higher alcohols, and to recover residual methanol. The methanol, with impurities, would be further refined to separate it from the light ends and then to separate it from ethanol; the order of these last two steps would not be significant. Such a distillation process would require large amounts of steam to produce a refined methanol of high quality. These large steam requirements result primarily from the necessity to remove by distillation all the methanol from the water in one column, then to remove all the methanol from the ethanol in a second distillation.

Attempts to reduce the steam requirements by making the separation in the first distillation column between methanol and light ends overhead and ethanol, water and heavy ends as a bottoms stream would not be totally successful as it may be shown that ethanol is more volatile (has a higher relative volatility) than methanol when both are present in low concentration in water. This is indicated by the plot of relative volatility of methanol to ethanol in water solution as a function of water concentration as shown in FIGURE 2.

The invention claimed in this application is the performance of the distillation of a crude methanol of the type described under conditions which do not permit the concentration of water to rise above that concentration where ethanol becomes the more volatile as compared to methanol. This will be referred to as the "critical" concentration." Contrary to the usual distillation practice where essentially all of a major component is sent either overhead or out the bottom of a distillation column, in this invention the major component, methanol, is made to split between overhead and bottoms by suitably choosing equipment and operating conditions. Sufficient methanol is caused to leave the bottom of the column to maintain the water content in the lower portion of the column at all times below the "critical concentration." It then becomes a relatively easy matter to dehydrate the methanol and ethanol from the bottoms of the crude column and following this to remove the methanol from the ethanol. The methanol so removed rejoins the main stream of methanol for final purification.

When operated in the peculiar fashion just described, the refining of methanol is surprisingly found to be much less costly than when performed by any other previously known method. The primary reason for the lower operating cost is that separation of heavy ends is performed on only a small portion of the methanol containing all the heavy ends which have been concentrated in the bottoms product of the first column by virtue of distillation below the "critical concentration" of water. Steam consumption in the process of the invention can be held below 4 pounds per pound of methanol produced.

Figure 2:
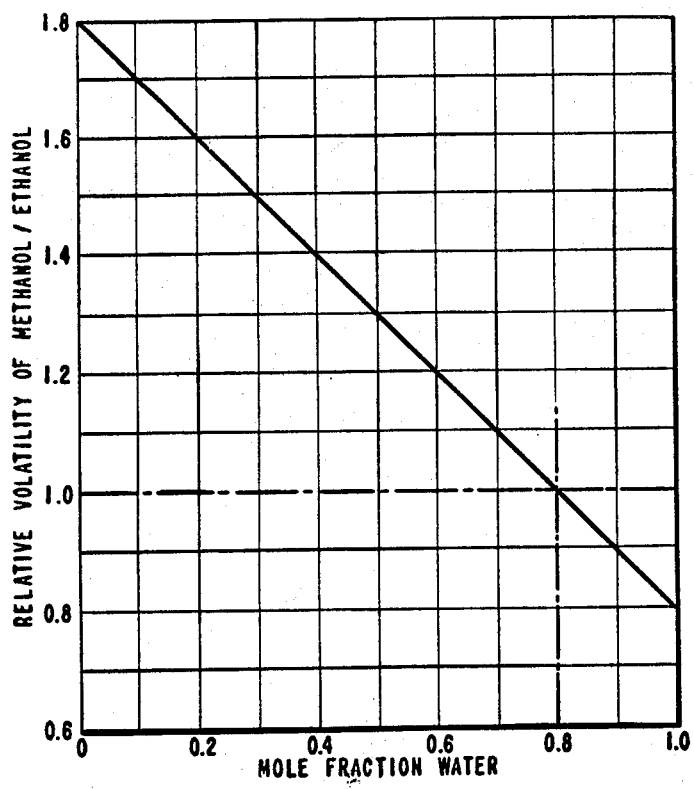
FIG. 2 is a graphical representation of the trend of data on vapor-liquid equilibrium measurements made on the system methanol-ethanol-water.

As shown in FIG. 2, the data indicate that the "critical concentration" referred to above is about 0.80 mole fraction of water. The data are not sufficiently precise to make it possible to say that this is the exact "critical concentration" and it may be possible to operate with a somewhat higher mole fraction of water, say 0.88 or even higher, in the bottoms product from the first column, and still achieve the result of this invention. However, for economic reasons it will ordinarily be preferred to operate with less than about 0.6 mole fraction of water in the bottoms from the first column. Thus location of the precise value of the "critical concentration" is not necessary to satisfactory practice of the invention.

Reference will be made to FIG. 1 of the drawing in the following specific example which illustrates an embodiment of the process of the invention.

Approximately 200 tons of methanol containing less than 10 p.p.m. ethanol as its principal impurity is obtained from a crude feed having the composition shown in column 1 of Table A below. The crude is introduced to column 1 (methanol splitter) through line 1 at a temperature of 30° C. and at atmosphere pressure. Column 1 has 80 sieve plates with a plate spacing of 18″; the feed is to plate No. 8 from the bottom.

Sulfuric acid is introduced through line 2 as indicated in column 2 of Table A. Purpose of the acid is to neutralize any basic impurities such as amines present in the crude. The acid feed is to plate No. 12. Heat is supplied to the column in reboiler $a$.

The overhead from Column I is withdrawn through vapor line 3 and condensed in condenser $b'$. A portion of the overhead is withdrawn through vapor line 4 and liquid line 5 and a portion is recycled to the top of the column through liquid line 6. In Table A the total amount of vapor through line 3 is shown in column 3, the total amount of reflux through line 6 is shown in column 6, the combined total of vapor and liquid purged from the system through lines 4 and 5 is shown in column 5, and the make-up of the overhead product is shown in column 5.

Relatively pure methanol is withdrawn from Column I at plate No. 75 through line 7; composition and total amount of this stream is shown in column 7 in Table A. The reflux ratio (O/D, where O is the total amount of reflux and D is the total amount of drawoff) in Column I is 3.0.

Bottoms of Column I is withdrawn through line 8; composition and total amount of the bottoms product is shown in column 8 of Table A.

Temperature and pressure of the bottom and top of Column I are shown in column 8 and 3, respectively, and temperature and pressure at plate No. 75 where the relatively pure methanol is withdrawn is shown in column 7 of Table A.

Heat is supplied to Column III in reboiler $c$. Make-up temperature, and composition of the feed are shown in column 8 of Table B below.

Vapor from Column III is withdrawn through line 9 and condensed in condenser $d$. A portion of the overhead product is recycled to the top of the column through line 11 and a portion is drawn off through line 10. Total amount of vapor is shown in column 9 of Table B; total amount of reflux is shown in column 11; and make-up and total amount of the overhead draw-off are shown in column 10. Reflux ratio in Column III is 1.5.

In an optional embodiment (not illustrated) a liquid side stream may be removed from Column III at a place from 5 to 10 plates from the top of the column and this stream is then fed to Column IV. Vapor is withdrawn from the top of Column III and condensed, with a small portion of the condensed overhead being fed into Column I at an appropriate location for the removal of additional low boilers. The remaining portion of the condensed overhead is recycled to the top of Column III as reflux.

Bottoms from Column III is withdrawn through line 12. Composition and total amount of the bottoms product is shown in column 12 of Table B.

Temperature and pressure at the bottom and top of Column III are shown in Columns 12 and 9, respectively.

TABLE B.—COLUMN III (DEHYDRATOR)

| | 8 | 9 | 10 | 11 | 12 |
|---|---|---|---|---|---|
| | Feed | Vapor | Make | Reflux | Tails |
| Pounds: | | | | | |
| DME | | ↑ | | ↑ | |
| Light Ends | | Same | | Same | |
| Methanol | 182,093 | comp. | 180,853 | comp. | 1,240 |
| Ethanol | 1,248 | as | 1,238 | as | 10 |
| Water | 102,800 | stream | 46 | stream | 102,754 |
| Heavy Ends | 2,244 | 10 | 671 | 10 | 1,573 |
| H₂SO₄ | 80 | ↓ | | ↓ | 80 |
| Total | 288,465 | 459,520 | 182,808 | 275,712 | 105,657 |
| Temp., °C | 83 | 65 | 65 | 65 | 102 |
| P.s.i.a | 21.0 | 14.8 | 14.8 | 14.8 | 19.3 |

The overhead product from Column III is fed through line 10 to Column IV (ethanol stripper). Column IV contains a total of 80 sieve plates with a spacing of 18″; feed is introduced at plate No. 22. Heat is supplied to Column IV in reboiler $e$. Make-up, temperature, and composition of the feed are shown in column 10 of Table C below.

Vapor from Column IV is withdrawn overhead through line 13 and condensed in condenser $f$. A portion of the overhead is recycled to the top of the column through line 15 and a portion is drawn off through line 14. Total amount of vapor is shown in column 13 of Table C; total amount of reflux is shown in column 15; and composition and total amount of the overhead draw-off are shown in column 14. Reflux ratio in Column IV is 4.0.

Optionally the overhead product of Column IV instead of being totally condensed in the condenser can have a portion of the vapor fed as such to Column II. This vapor stream would be separately introduced into Column II at or near the bottom of the column.

TABLE A.—COLUMN I (METHANOL SPLITTER)

| | 1 | 2 | 3 | 4 | 5 | 6 | 7 | 8 |
|---|---|---|---|---|---|---|---|---|
| | Crude Feed | Acid Feed | Vapor | Vent. | Heads | Reflux | Make | Tails |
| Pounds: | | | | | | | | |
| DME | 3,865 | | ↑ | ↑ | 3,772 | ↑ | 93 | |
| Light Ends | 879 | | Same | Incl'd. | 796 | Same | 83 | |
| Methanol | 411,394 | | comp. | in | 6,852 | comp. | 222,449 | 182,093 |
| Ethanol | 1,250 | | as | stream | | as | 2 | 1,248 |
| Water | 102,800 | | stream | 5. | | stream | | 102,800 |
| Heavy Ends | 2,244 | | 5. | | | 5. | | 2,244 |
| H₂SO₄ | | 80 | ↓ | | | ↓ | | 80 |
| Total | 522,432 | 80 | 713,561 | | 11,420 | 702,141 | 222,627 | 288,465 |
| Temp., °C | 30 | 30 | 56 | 56 | 56 | 56 | 66 | 83 |
| P.s.i.a | 14.9 | 14.9 | 14.8 | 14.7 | 14.8 | 14.8 | 14.9 | 210 |

Bottoms product from Column I is fed through line 8 to plate No. 18 of Column III (dehydrator), which contains a total of 60 sieve plates with a spacing of 18″.

Bottoms from Column IV is withdrawn through line 16; composition and total amount of bottoms is shown in column 16 of Table C.

Temperature and pressure at the bottom and top of Column IV are shown in columns 16 and 13, respectively, of Table C.

TABLE C.—COLUMN IV (STRIPPER)

|  | 10 | 13 | 14 | 15 | 16 |
|---|---|---|---|---|---|
|  | Feed | Vapor | Make | Reflux | Tails |
| Pounds: |  | ↑ |  | ↑ |  |
| DME |  | Same |  | Same |  |
| Light Ends |  | comp. |  | comp. |  |
| Methalol | 180,853 | as | 177,935 | as | 2,918 |
| Ethanol | 1,238 | stream | 1 | stream | 1,237 |
| Water | 46 | 14 |  | 14 | 46 |
| Heavy Ends | 671 | ↓ |  | ↓ | 671 |
| Total | 182,808 | 889,680 | 177,936 | 711,744 | 4,872 |
| Temp., °C | 65 | 65 | 65 | 65 | 81 |
| P.s.i.a. | 14.8 | 14.8 | 14.8 | 14.8 | 21.3 |

The overhead product from Column IV passes through line 14 and is mixed with the methanol stream withdrawn from plate No. 75 of Column I. The combined streams are then fed through line 17 to Column II (refiner). Column II has a total of 35 sieve plates with a spacing of 18″; feed is introduced to the 17th plate. Heat is supplied to the column in reboiler g. Composition, total amount, temperature and pressure of the feed are shown in column 17 of Table D below.

The overhead product from Column II is withdrawn through vapor line 18 and condensed in condenser h. A portion of the condensed overhead is recycled to the top of the column through line 20 and a portion is drawn off through line 19. Total amount of vapor and temperature and pressure at the top of the column are shown in column 18 of Table D; total amount of reflux is shown in column 20; and composition and total amount of the overhead drawoff are shown in column 19. Reflux ratio in Column II is 300.

Bottoms from Column II is withdrawn through line 21 at a temperature of 69° C. and a pressure of 17.5 p.s.i.a. As shown in column 21 of Table D, the bottoms product is highly refined methanol with an ethanol content of less than 10 parts by weight per million parts of methanol, which is well below present commercial standards for purity.

TABLE D.—COLUMN II (REFINER)

|  | 17 | 18 | 19 | 20 | 21 |
|---|---|---|---|---|---|
|  | Feed | Vapor | Heads | Reflux | Tails |
| Pounds: |  | ↑ |  | ↑ |  |
| DME | 93 | Same | 93 | Same |  |
| Light Ends | 83 | comp. | 83 | comp. |  |
| Methanol | 400,384 | as | 1,315 | as | 399,069 |
| Ethanol | 3 | stream |  | stream | 3 |
| Water |  | 19 |  | 19 |  |
| Heavy Ends |  | ↓ |  | ↓ |  |
| Total | 401,563 | 448,791 | 1,491 | 447,300 | 399,072 |
| Temp., °C | 65 | 61 | 61 | 61 | 69 |
| P.s.i.a. | 14.8 | 14.8 | 14.8 | 14.8 | 17.5 |

In the above tables, where a given stream is indicated as being devoid of a given component, it will be understood that there may actually be a negligible amount, say up to 2 or 3 p.p.m. or more, of that component present, since distillation as a practical matter never produces total separation. The actual amount will, of course, be dependent upon a number of variables including composition of the crude feed.

It will also be understood, of course, that the above example is given for purpose of illustration only, and should not be construed as limiting the invention, since considerable leeway in the column design (number, type, and spacing of plates, location of feed and product streams) and operation (pressures, temperatures, and reflux ratios) are possible. For example, the crude methanol can be fed to the first column (methanol splitter) at ambient temperature, or it can be preheated to near the boiling point under the working pressure. Pressures higher than atmospheric can be used in any or all of the columns, with the advantage of reduction in the size of equipment required for a given capacity. Ordinarily, however, pressures above about 4 atmospheres would not be suitable, since the separation proceeds better near atmospheric pressure. The columns can, of course, be operated under slight vacuum, say 0.5 atmosphere, but any advantage in doing so would be more than offset by the increased size of the equipment required for a given capacity. It is contemplated that minor changes in the design and operating parameters will be required for changes in crude composition and product purity and yield. It is, of course, within the ordinary skill of the engineer to effect such changes without departing from the spirit or scope of the invention.

Table E which follows is given to exemplify possible variations in parameters.

TABLE E.—DISTILLATION PARAMETERS

| Column | Total No. Plates Range | Stream No. | Location, Plate No. Range | Stream No. | Location, Plate No. Range | Reflux Ratio Range |
|---|---|---|---|---|---|---|
| I (Methanol splitter) | 60-85 | 1 | 6-12 | 7 | 70-76 | 2.0-3.5 |
|  |  | 2 | 8-15 | 8 | [2] 0-5 |  |
| III (Dehydrator) | 45-70 | 8 | 12-20 | 12 | [2] 0-5 | 1.2-2.0 |
| IV (Stripper) | 60-85 | 10 | 15-30 |  |  | 3.0-4.5 |
| II (Refiner) | 25-45 | [1] 17 | 12-22 |  |  | 100-500 |
|  |  | (14) | 2-12 |  |  |  |
|  |  | (7) | 15-30 |  |  |  |

[1] 17 is combined 14 + 7; 14 and 7 could be fed to Column IV separately at different locations, as shown.
[2] Either 8 or 12 could be withdrawn a few plates above the bottom, in which case there would be another stream from the bottom of that column. Purpose would be to concentrate acid residue in the bottom of the column.

NOTE.—Bottom plate is No. 1.

Phosphoric acid or some other convenient, conventional neutralizing agent can be substituted for the sulfuric acid used in the example. Alternatively, the crude can be neutralized with an ion exchange resin, as will be readily understood. Usually only a very small amount, if any, of neutralizing agent will be required. From 2 to 200 p.p.m. and ordinarily from 5 to 20 p.p.m., will be sufficient.

The invention claimed is:

1. A process for refining a crude methanol product containing between about 15 and 25 weight percent water and about 1 to 3 weight percent organic impurities comprising light and heavy ends, ethanol and dimethyl ether which comprises: feeding the crude to a first column, removing a methanol side stream from the upper section of the column which stream is essentially free of water, ethanol, and heavy ends, removing light ends and dimethyl ether overhead, and removing water, methanol, ethanol, and heavy ends from the bottom, the mole fraction of water in the bottoms being less than about 0.8; feeding the methanol side stream from the first column to a second column, removing residual light ends and dimethyl ether overhead from the second column and removing a bottoms product consisting of high purity methanol and which is essentially free of ethanol; feeding the bottoms product from the first column to a third column, removing water and heavy ends from the bottom and removing overhead methanol, ethanol and residual heavy ends; feeding the overhead from the third column to a fourth column, removing the ethanol and residual heavy ends from the bottom and removing methanol overhead; and feeding the methanol overheaded from the fourth column to the second column for removal of any residual light ends.

2. A process as defined in claim 1 wherein the mole fraction of water in the bottoms from the first column is less than 0.6.

3. A process as defined in claim 1 wherein the methanol product from the bottom of the second column contains less than 10 p.p.m. ethanol.

4. A process as defined in claim 1 wherein the loss of methanol in the system is less than 3% of the methanol in the crude stream.

5. A process as defined in claim 1 wherein the steam consumption is less than 4 pounds per pound of methanol.

6. A process as defined in claim 1 wherein 2 to 200 p.p.m. of an acid is introduced into the first column to neutralize basic impurities present in the crude stream.

References Cited

UNITED STATES PATENTS

| 2,364,341 | 12/1944 | Bright et al. | 203—2 |
| 2,470,222 | 5/1949 | Patterson | 203—43 |
| 2,551,584 | 5/1951 | Carlson et al. | 203—83 |
| 2,666,735 | 1/1954 | Morrell et al. | 203—37 |
| 2,806,816 | 9/1957 | Staib et al. | 260—643 |
| 2,904,575 | 9/1959 | Peet | 260—449.5 |
| 3,092,667 | 6/1963 | Murphy | 260—643 |
| 3,230,156 | 1/1966 | Katzen | 203—37 |

NORMAN YUDKOFF, *Primary Examiner.*

F. E. DRUMMOND, *Assistant Examiner.*